(12) United States Patent
Chen et al.

(10) Patent No.: US 10,576,385 B1
(45) Date of Patent: Mar. 3, 2020

(54) FABRICATION OF LANYARD

(71) Applicant: Facebook Technologies, LLC, Menlo Park, CA (US)

(72) Inventors: Yi-Yaun Chen, Seattle, WA (US); Shane Michael Ellis, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 162 days.

(21) Appl. No.: 15/693,443

(22) Filed: Aug. 31, 2017

(51) Int. Cl.
| | | |
|---|---|---|
| A63F 13/00 | (2014.01) |
| A45F 5/00 | (2006.01) |
| B29C 65/00 | (2006.01) |
| B32B 37/00 | (2006.01) |
| B32B 38/00 | (2006.01) |
| A63F 13/98 | (2014.01) |
| B29C 65/48 | (2006.01) |
| B29C 65/16 | (2006.01) |
| B29L 31/00 | (2006.01) |
| B32B 37/14 | (2006.01) |
| B32B 37/18 | (2006.01) |
| B32B 37/12 | (2006.01) |

(52) U.S. Cl.
CPC ............... *A63F 13/98* (2014.09); *A45F 5/00* (2013.01); *B29C 65/16* (2013.01); *B29C 65/48* (2013.01); *A45F 2005/006* (2013.01); *A45F 2005/008* (2013.01); *A45F 2200/05* (2013.01); *A63F 13/00* (2013.01); *B29L 2031/726* (2013.01); *B32B 37/0076* (2013.01); *B32B 37/12* (2013.01); *B32B 37/142* (2013.01); *B32B 37/18* (2013.01); *B32B 37/182* (2013.01); *B32B 38/0004* (2013.01); *Y10T 156/1036* (2015.01); *Y10T 156/1062* (2015.01)

(58) Field of Classification Search
None
See application file for complete search history.

(56) References Cited

U.S. PATENT DOCUMENTS 1,421,730 A * 7/1922 Scusa ................ B65B 25/148
53/581
5,799,895 A * 9/1998 Michaud ............ A47K 10/3836
242/423

(Continued)

OTHER PUBLICATIONS

Wrapped toilet paper and other guest essentials for the holidays, Nov. 19, 1995, by Heather, pp. 17, (Year: 1995).*

*Primary Examiner* — Linda L Gray
(74) *Attorney, Agent, or Firm* — Fenwick & West LLP

(57) ABSTRACT

Embodiments relate to fabricating a lanyard that includes the assembly of a strap sheet, a fabric strip sheet, and a stopper column. The strap sheet is wrapped around the stopper column and the ends of the strap sheet are adhered to itself to form a closed loop of the lanyard. The inner surface of the strap sheet is attached to the stopper column and the ends of the strap sheet are further attached to the fabric strip sheet to form the assembly. The assembly is cut to obtain multiple lanyards that include a portion of the strap sheet (e.g., a strap), a portion of the fabric strip sheet (e.g., a fabric strip), and a portion of the stopper column (e.g., a stopper). One end of each lanyard can be worn by an individual whereas a second end of the lanyard can be coupled to another structure, such as a handheld controller.

5 Claims, 6 Drawing Sheets

(56) References Cited

U.S. PATENT DOCUMENTS

| | | | | |
|---|---|---|---|---|
| 6,802,279 B1 * | 10/2004 | Johnson | ............... | G09F 11/23 |
| | | | | 116/306 |
| 6,820,664 B1 * | 11/2004 | Ritch | ............... | A45C 3/08 |
| | | | | 150/103 |
| 8,210,406 B2 * | 7/2012 | Moreau | ............... | A45F 5/00 |
| | | | | 224/219 |
| 2015/0305480 A1 * | 10/2015 | Brousseau | ............... | A45F 5/10 |
| | | | | 224/267 |

* cited by examiner

FABRICATION OF LANYARD

CROSS-REFERENCE TO RELATED APPLICATIONS

This application is related to U.S. patent application Ser. No. 15/693,436 filed on Aug. 31, 2017 and U.S. patent application Ser. No. 15/964,732 filed on Apr. 27, 2018.

BACKGROUND

This disclosure generally relates to a lanyard, and more specifically, to a lanyard for attaching to a handheld controller.

Controllers are used in controlling electronics during various activities such as during gaming. Many controllers are designed to be hand-held and can therefore be easily controlled by hand. However, during many of these activities (e.g., gaming), hand-held controllers run the risk of being inadvertently dropped or thrown, thereby resulting in undesirable damage being inflicted to the controller.

SUMMARY

Embodiments relate to fabricating a controller lanyard assembly that can be worn around an individual's wrist to reduce the risk of damage to a controller due to inadvertent dropping or throwing of the controller. The controller lanyard assembly is fabricated by assembling a strap sheet, a fabric strip sheet, and a stopper column. The strap sheet is wrapped around the stopper column and the ends of the strap sheet are adhered to each other and to the outer surface of the stopper column so that the strap sheet forms a closed loop. The fabric strip sheet is attached to the strap sheet by covering the ends of the strap sheet that are adhered to the outer surface of the stopper. The fabric strip sheet can extend along the outer surface of the strap sheet to increase the structural integrity of the lanyard. The inner surface of the strap sheet wrapped to be in contact with the stopper column can be further attached to the stopper column.

The assembly of the strap sheet, fabric strip sheet, and stopper column can be cut to obtain multiple lanyards. Each lanyard includes a strap (the portion of the strap sheet), a fabric strip (the portion of the fabric strip sheet), and a stopper (the portion of the stopper column). Therefore, the strap can be wrapped around a user's wrist whereas the stopper wrapped within the strap and fabric strip can be coupled to a controller.

DETAILED DESCRIPTION

Figure 1:
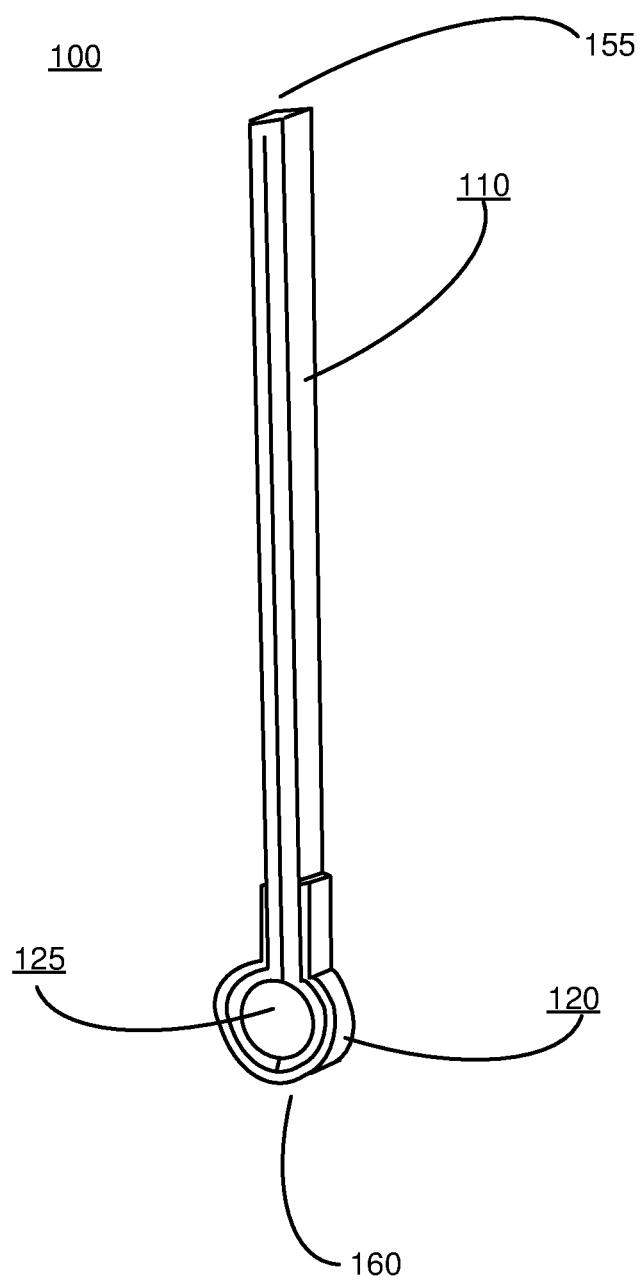
FIG. 1 is a perspective diagram of a lanyard in accordance with an embodiment.

Reference will now be made in detail to several embodiments, examples of which are illustrated in the accompanying figures. It is noted that wherever practicable similar or like reference numbers may be used in the figures and may indicate similar or like functionality. For example, a letter after a reference numeral, such as "first internal surface 236A," indicates that the text refers specifically to the element having that particular reference numeral. A reference numeral in the text without a following letter, such as "internal surface 236," refers to any or all of the elements in the figures bearing that reference numeral (e.g. "internal surface 236" in the text refers to reference numerals "first internal surface 236A" and/or "second internal surface 236B" in the figures).

Example Lanyard

FIG. 1 is a perspective diagram of a lanyard 100 in accordance with an embodiment. In various embodiments, such as one shown in FIG. 1, the lanyard 100 can include a lanyard formed from a strap 110, a fabric strip 120, and a stopper 125. The lanyard 100 can have a first end 155 and a second end 160.

The first end 155 of the lanyard 100 includes the strap 110 which, as shown in FIG. 1, is folded upon itself. Portions of the strap 110 that are folded upon itself can be separated to form an open space (not shown in FIG. 1). An individual can place his/her hand through the open space such that the lanyard 100 can be wrapped around the individual's wrist. The first end 155 of the lanyard 100 is a closed loop. The second end 160 of the lanyard 100 includes the stopper 125 wrapped within the strap 110, which is further held together by the fabric strip 120. The second end 160 of the lanyard 100 enables the lanyard 100 to couple with an opposing structure, such as a handheld controller.

In various embodiments, the strap 110 may be composed of any one of nylon, polyester, silk, rayon, polypropylene, polyethylene, aramid, and the like. The fabric strip 120 may similarly be composed of any one of nylon, polyester, silk, rayon, polypropylene, polyethylene, aramid, and the like. The stopper 125 can be composed of a metal or one of a polypropylene, polyethylene, aramid, and the like. Each of the strap 110, fabric strip 120, and stopper 125 are described in further detail below.

Figure 2A:
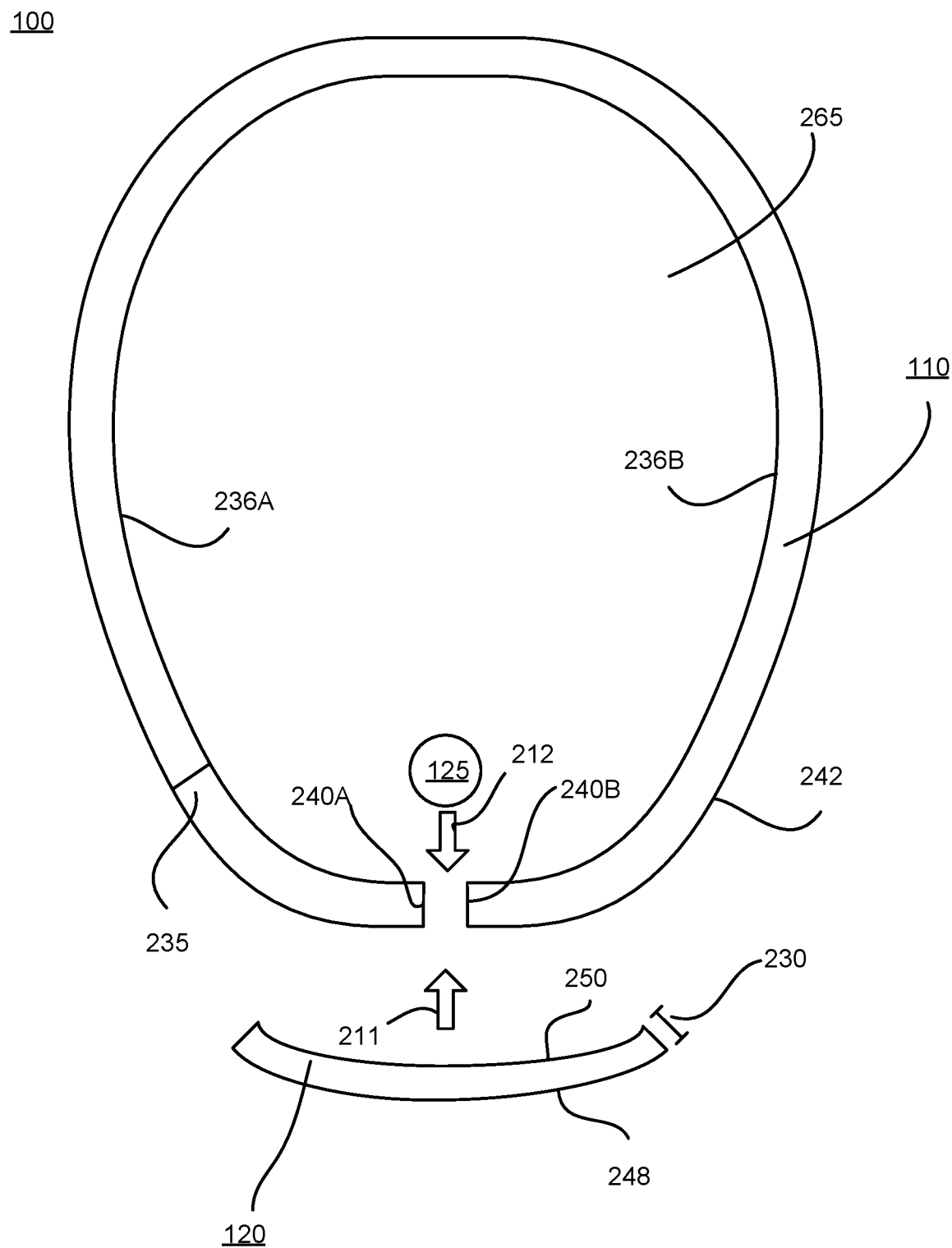
FIG. 2A is a cross sectional diagram illustrating components of the lanyard, in accordance with one embodiment.

FIG. 2A is a cross sectional diagram illustrating components of the lanyard 100, in accordance with one embodiment. In some embodiments, the lanyard 100 may further include a lanyard adjuster (shown as element 275 in FIG. 2B). Although the description hereafter refers to the assembly of a single lanyard, the description can also apply to the assembly of a structure that can be cut into multiple lanyards, as is discussed below in relation to FIG. 3. For example, each of the strap 110, fabric strip 120, and stopper 125 can be embodied as extended structures such as a strap sheet, a fabric strip sheet, and a stopper column. Therefore, the strap sheet, fabric strip sheet, and stopper column can be assembled, as described hereafter, and then cut to obtain multiple lanyards.

FIG. 2A depicts the components of the lanyard 100 and how they are attached to form a conjoined unit. In various embodiments, the components of the lanyards may be shaped or positioned differently than as shown in FIG. 2A. For example, the stopper 125 illustrated as a cylindrical structure in FIG. 2A may be cubic shaped or be in the shape of any other polyhedron.

The strap 110 of the lanyard 100 is a component that forms the main structure of the lanyard 100 and includes two ends 240A, 240B. The strap 110 includes an inner surface 236 (e.g., made up of first inner surface 236A and second inner surface 236B), an external surface 242, and ends 240A and 240B. The fabric strip 120 is responsible for holding together the ends 240A and 240B of the strap 110 and includes an internal surface 250 and an external surface 248. In various embodiments, the strap 110 has a first width 235 and the fabric strip 120 has a second width 230. As one example, the width 235 of the strap 110 is larger than the width 230 of the fabric strip 120.

The lanyard 100 is fabricated by gluing the internal surface 250 of the fabric strip 120 onto the outer surface 242 of the strap 110, as shown by arrow 211. In this way, the outer surfaces of the ends 240A, 240B are securely attached and thereby the strap 110 forms a loop with an open space 265. In some embodiments, the ends 240A and 240B are first adhered to each other prior to being glued to the fabric strip 120. The stopper 125 is also glued onto the inner surfaces 236 around the ends 240A, 240B, as shown by arrow 212. Then, the remaining inner surfaces 236 of the strap 110 are partially glued together to form a structure as illustrated in FIG. 2B.

Figure 2B:
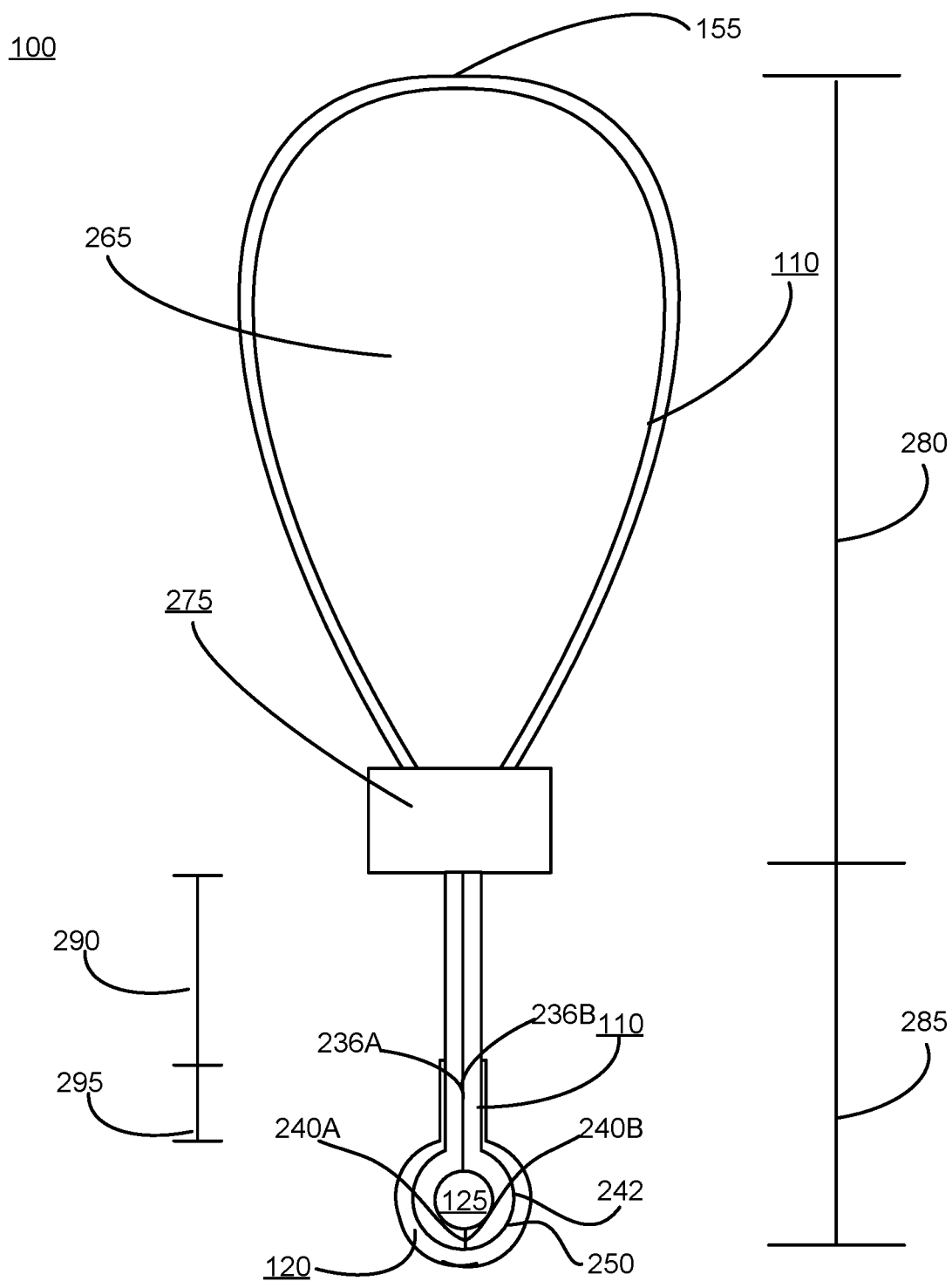
FIG. 2B is a detailed view of an assembled lanyard, in accordance with an embodiment.

Reference is now made to FIG. 2B, which depicts a detailed view of an assembled lanyard 100, in accordance with an embodiment. Here, the assembled lanyard 100 of FIG. 2B further includes the lanyard adjuster 275 located along the length of the lanyard 100. As shown in FIG. 2B, the lanyard adjuster 275 divides the lanyard 100 into a first portion 280 including the first end 155 of the lanyard 100 and a second portion 285 including the second end 160 of the lanyard 100. In this embodiment, the first end 155 of the lanyard 100 is composed of the strap 110 whereas the second end 160 of the lanyard 100 is composed of the stopper 125 wrapped within the strap 110, which is further held together by the fabric strip 120.

As depicted in FIG. 2B, the inner surface 250 of the fabric strip 120 is coupled to the external surface 242 of the strap 110, thereby ensuring that the stopper 125 resides within the strap 110. In one embodiment, the inner surface 250 of the fabric strip 120 is coupled to the external surface 242 of the strap 110 through an adhesive such as tape, glue, sewing adhesive, VELCRO, and the like.

The fabric strip 120 is further coupled to surround and secure the ends 240A, 240B of the strap 110. As depicted in FIG. 2B, the fabric strip 120 is attached to the external surface 242 of the strap 110 on and around the ends 240A, 240B of the strap 110. In some embodiments, as shown in FIG. 2B, the fabric strip 120 is attached to the external surface 242 of the strap 110 along the vertical portion of the strap 110. This improves the structural integrity of the connection between the stopper 125 and strap 110 assembly and the rest of the lanyard 100. The strap 110 and the fabric strip 120 can be attached using, for example, an adhesive such as tape, glue, sewing adhesive, and VELCRO.

In some embodiments, portions of the strap 110 are further coupled to other portions of the strap 110. For example, as shown in FIG. 2B, a first internal surface 236A of the strap 110 is coupled to a second internal surface 236B of the strap 110. Specifically, the first internal surface 236A and the second internal surface 236B coupled to one another can span a distance from the lanyard adjuster 275 to the stopper 125. In various embodiments, the first internal surface 236A and the second internal surface 236B coupled to one another spans a portion of the distance between the lanyard adjuster 275 and the stopper 125.

The first internal surface 236A and the second internal surface 236B of the strap 110 are depicted as vertical portions of the strap 110 in FIG. 2B. In various embodiments, the vertical portion of the first internal surface 236A that is coupled with the second internal surface 236B mirrors the vertical distance in which the fabric strip 120 extends vertically along the strap 110. In the example shown in FIG. 2B, the first internal surface 236A is coupled to the second internal surface 236B for distance 295 but the two internal surfaces 236A are not coupled to each other for distance 290.

The stopper 125 serves as the structure that couples the lanyard 100 to an opposing structure, such as a handheld controller. As one example, the stopper 125 can serve as a structural detent that mechanically couples to the opposing structure and prevents the lanyard 100 from decoupling from the opposing structure. Generally, the stopper 125 is housed within the strap 110, which is further located internal to the fabric strip 120. For example, as shown in FIG. 2B, when the lanyard 100 is assembled, the stopper 125 is surrounded by the strap 110. In various embodiments, the surface of the stopper 125 may be modified to ensure that the stopper 125 remains in contact with and/or housed within the strap 110. For example, the surface of the stopper 125 can be modified using adhesives such that the surface of the stopper 125 contacts and couples the strap 110 such that the stopper 125 is translationally and rotationally fixed relative to the strap 110.

The lanyard adjuster 275 is coupled with the lanyard 100 and controls the size of the open space 265 that is available for receipt of an individual's hand. In various embodiments, the lanyard 100 passes through the lanyard adjuster 275. Therefore, the lanyard adjuster 275 can shift along the length of the lanyard 100 to adjust the size of the open space 265.

Example Method of Fabricating Lanyards

Figure 3:
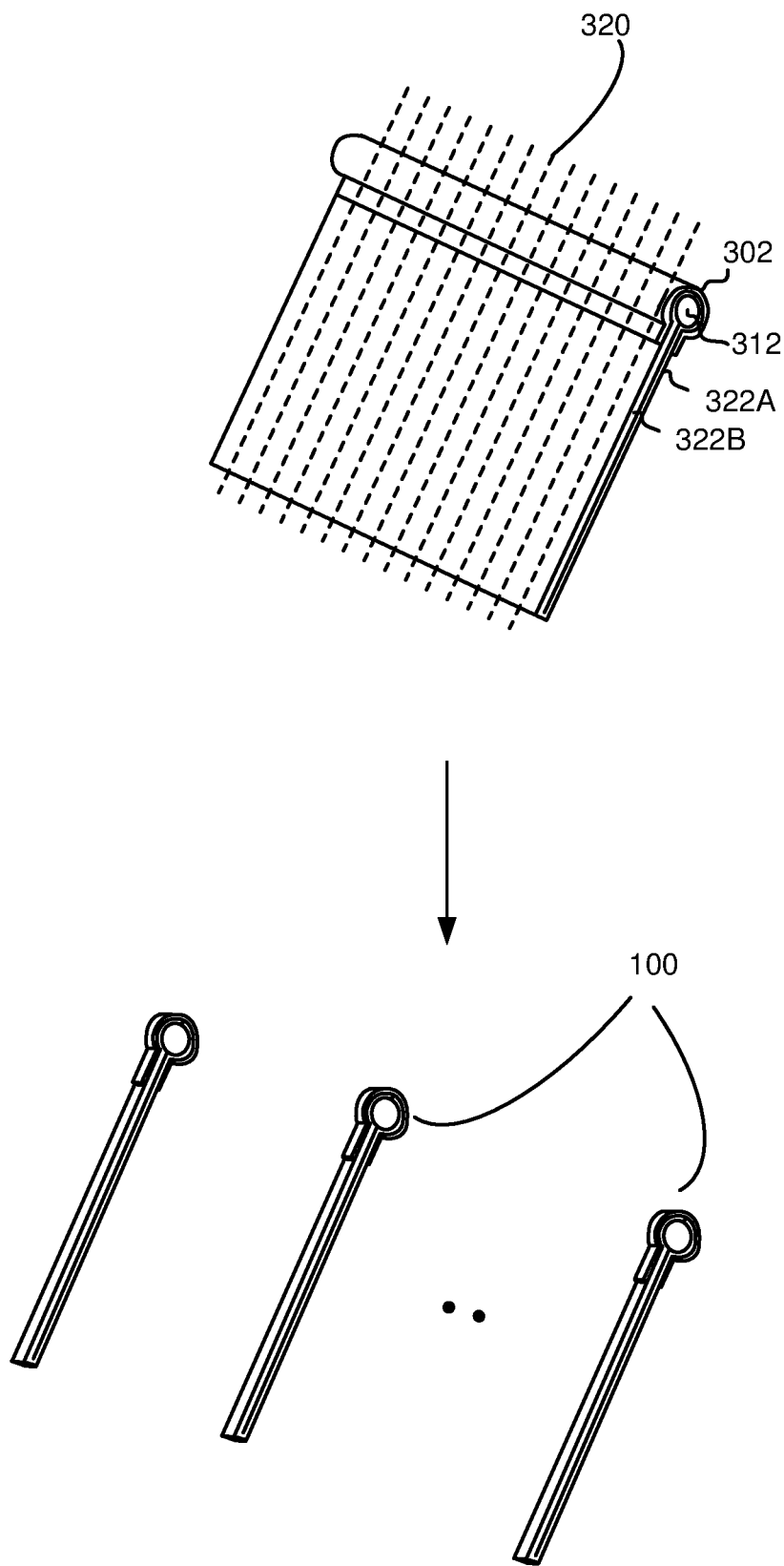
FIG. 3 depicts a method of fabricating a plurality of lanyards from a strap sheet, a fabric strip sheet, and a stopper column, in accordance with an embodiment.

FIG. 3 depicts a method of fabricating a plurality of lanyards 100 from various sheets 302 and 322 and a stopper column 312, in accordance with an embodiment. As shown in FIG. 3, a strap sheet 322 (corresponding to the strap 110 of the lanyard 100) and a fabric strip sheet 302 (corresponding to the fabric strip 120 of the lanyard 100) are assembled around the stopper column 312 (corresponding to the stopper 125 of the lanyard 100). In one embodiment, the strap sheet 322 and fabric strip sheet 302 are assembled around the stopper column 312 using a method similar to the method described above in relation to FIG. 2A.

Specifically, a first portion 322A of the strap sheet 322 and a second portion 322B of the strap sheet 322 can be glued together to the surface of the stopper column 312. Additionally, the ends of each portion of the strap sheet 322A and 322B can be glued to each other, as was depicted in FIG. 2A as the attachment between the ends 240A and 240B. The fabric strip sheet 302 is assembled with external surfaces of the first portion 322A of the strap sheet 322 and the second portion 322B of the strap sheet 322 around the attached ends of each portion. Therefore, the stopper column 312 resides within the strap sheet 322 whose ends are held together by the fabric strip sheet 302. In various embodiments, the first portion 322A of the strap sheet 322 can be further adhered to the second portion 322B of the strap sheet 322, similar to the adherence between the first internal surface 236A and second internal surface 236B of the strap 110, as previously described in relation to FIG. 2B.

Individual lanyards 100 can be fabricated from the assembly that includes the strap sheet 322, the stopper column 312, and the fabric strip sheet 302. For example, a die-cutting process can be employed to slice along the dotted lines 320 as depicted in FIG. 3 to fabricate each individual lanyard 100, as shown in FIG. 1. In some embodiments, other cutting processes can be employed including laser cutting/etching or router cutting.

Figure 4A:
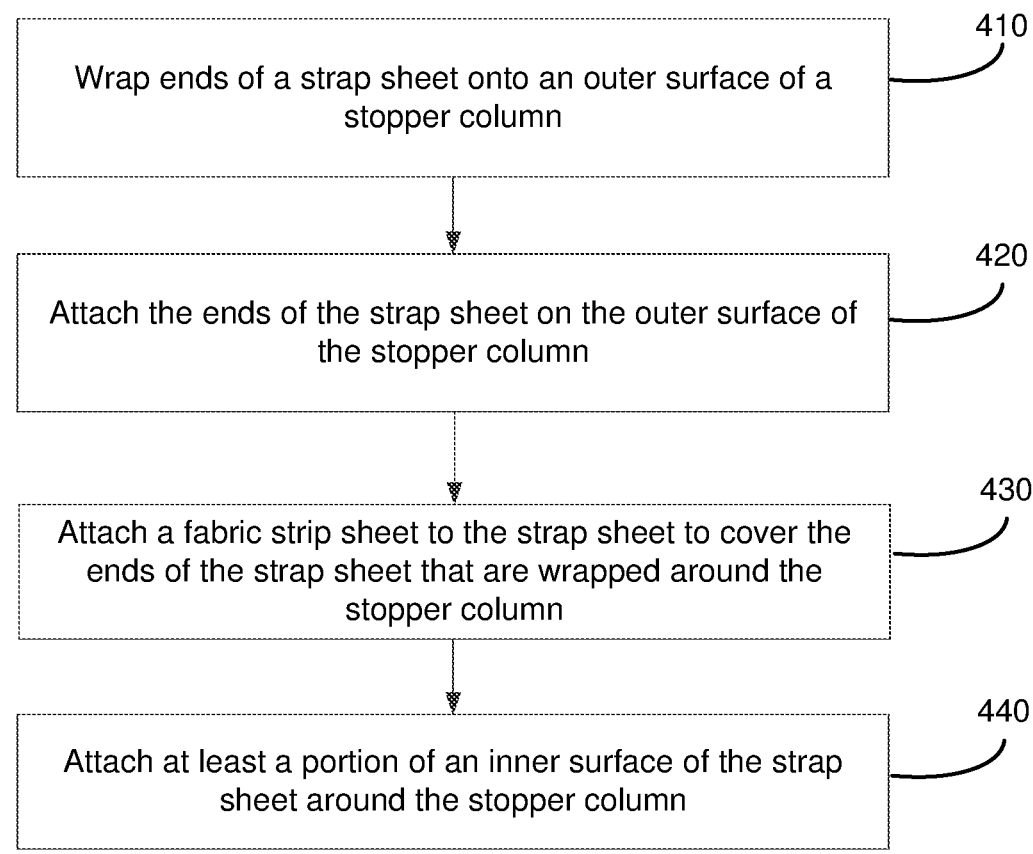
FIG. 4A is a flowchart illustrating an example flow process for fabricating a lanyard, in accordance with an embodiment.

FIG. 4A depicts a flowchart of an example flow process 400 for fabricating a lanyard 100, in accordance with a first embodiment. The ends of a strap sheet 322 are wrapped 410 onto an outer surface of a stopper column 312. The ends of the strap sheet 322 are attached 420 onto the outer surface of the stopper column 312. To further seal the ends of the strap sheet 322, a fabric strip sheet 302 is attached 430 to the strap sheet 322 to cover the ends of the strap sheet 322 that are wrapped around the outer surface of the stopper column 312. At least a portion of an inner surface of the strap sheet 322 that is wrapped around the stopper column 312 is further attached 440 to the stopper column 312.

Figure 4B:
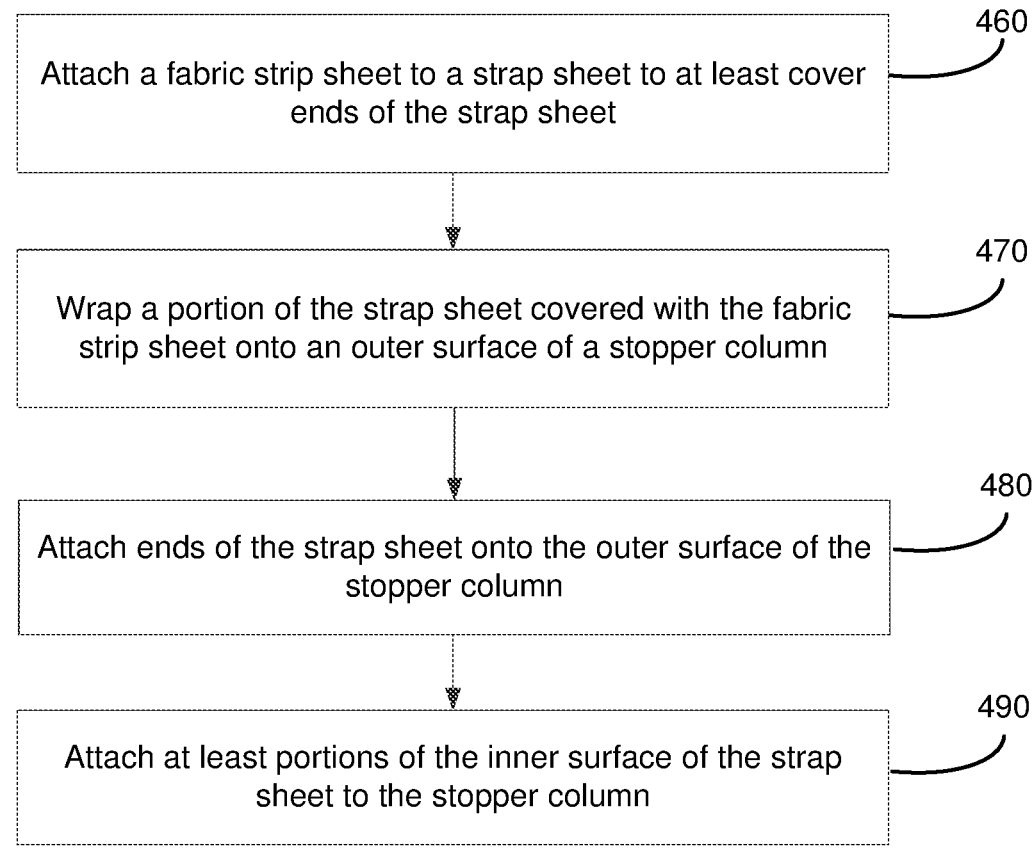
FIG. 4B is a flowchart illustrating an example flow process for fabricating a lanyard, in accordance with another embodiment.

FIG. 4B depicts an example flow process 450 for fabricating a lanyard 100, in accordance with another embodiment. In comparison to FIG. 4A, FIG. 4B depicts a different ordering of steps for fabricating the lanyard 100. A fabric strip sheet 302 is attached 460 to a portion of a strap sheet 322 to at least cover ends of the strap sheet 322. The portion of the strap sheet 322 covered with the fabric strip sheet 302 is wrapped 470 onto an outer surface of a stopper column 312. The ends of the strap sheet are attached 480 onto the outer surface of the stopper column 312. Additionally, at least portions of the inner surface of the strap sheet 302 which are wrapped onto the outer surface of the stopper column are attached 490 to the stopper column 312.

For either of the flow process embodiments described in FIG. 4A or 4B, the assembled strap sheet 322, fabric strip sheet 302, and stopper column 312 can be cut (e.g., die-cutting, laser cutting, or router cutting) to obtain the individual lanyards 100.

What is claimed is:

1. A method for fabricating a lanyard assembly, the method comprising:
   wrapping ends of a strap sheet onto an outer surface of a stopper column;
   attaching the ends of the strap sheet onto the outer surface of the stopper column;
   attaching a fabric strip sheet having a width narrower than a width of the strap sheet to cover at least the ends of the strap sheet wrapped around the stopper column after attaching the ends of the strap sheet onto the outer surface of the stopper column; and
   attaching at least portions of an inner surface of the strap sheet around the stopper column.

2. The method of claim 1, further comprising dicing the strap sheet, the fabric strip sheet, and the stopper column to obtain a plurality of lanyard assemblies.

3. The method of claim 2, wherein the dicing is performed using one of die-cutting, laser cutting, and router cutting.

4. The method of claim 2, further comprising coupling a strap of at least one lanyard assembly with a lanyard adjuster.

5. The method of claim 1, further comprising adhering the ends of the strap sheet to each other before attaching the ends of the strap sheet onto the outer surface of the stopper column.

* * * * *